United States Patent [19]

Sparrow et al.

[11] 4,130,698
[45] Dec. 19, 1978

[54] POLYURETHANE FOAM CONTAINING INTERNAL MOLD-RELEASE AGENT

[75] Inventors: David J. Sparrow, Korbeek-lo; Willy Van Autgaerden, Heverlee, both of Belgium

[73] Assignee: Imperial Chemical Industries Limited, London, England

[21] Appl. No.: 773,230

[22] Filed: Mar. 1, 1977

[30] Foreign Application Priority Data

Mar. 29, 1976 [GB] United Kingdom ............... 12536/76

[51] Int. Cl.² .................. C08G 18/14; C08G 18/08; C09K 3/00
[52] U.S. Cl. ................................. 521/130; 252/182; 521/51; 521/155; 264/300
[58] Field of Search ............. 106/38.24; 260/2.5 AG, 260/2.5 AL, 2.5 AZ, 18 TN, 2.5 AK, 2.5 A, 2.5 AD; 252/182

[56] References Cited

U.S. PATENT DOCUMENTS

| | | | |
|---|---|---|---|
| 2,358,475 | 9/1944 | Pratt et al. | 260/18 TN |
| 3,165,483 | 1/1965 | Gemeinhardt et al. | 260/2.5 AG |
| 3,499,852 | 3/1970 | Schroeder et al. | 260/18 TN |
| 3,925,527 | 12/1975 | Kleimann et al. | 260/2.5 AG |
| 4,024,088 | 5/1977 | Godlewski | 260/2.5 A |
| 4,058,492 | 11/1977 | von Bonin et al. | 260/2.5 AG |

FOREIGN PATENT DOCUMENTS

| | | | |
|---|---|---|---|
| 12496 | 7/1970 | Japan | 106/38.24 |
| 48-18396 | 8/1973 | Japan | 260/2.5 A |

OTHER PUBLICATIONS

Saunders et al.–Polyurethanes, Part II, Interscience, N.Y. (1964), pp. 99–106.
U.S. Testing Co.–Tables & Data; pp. 28–29, Composition & Constants of Fats & Oils, published about 1954.

*Primary Examiner*—H.S. Cockeram
*Attorney, Agent, or Firm*—Cushman, Darby & Cushman

[57] ABSTRACT

A mold-release agent is provided which consists essentially of 99.9% to 80% by weight of an aromatic polyisocyanate containing at least two isocyanate groups and 0.1% to 20% by weight of a fatty acid ester, e.g., glycerol trioleate, olive oil, peanut oil, etc. A process of using the material by incorporating it in polyurethane foams is disclosed.

12 Claims, No Drawings

POLYURETHANE FOAM CONTAINING INTERNAL MOLD-RELEASE AGENT

The present invention relates to a process for the production of polyurethane foam mouldings and materials therefor.

Polyurethane foam mouldings having a cellular core and continuous outer skin are useful in for example the furniture, automobile industry. The mouldings are generally prepared by introducing a mixture of polyurethane foam forming chemicals into a mould which is usually closed and heatable. The mixture is allowed to react whereupon a foam is formed inside the mould and solidifies whilst being compressed within the mould, so forming a foamed article which corresponds to the shape of the inside of the mould.

After completion of the polyurethane foam forming reaction, the mould is opened and the article withdrawn. However, problems can arise due to the article sticking or adhering to the mould or having insufficient shrinkage, so rendering it difficult to extract it from the mould. Such a difficulty can lead to damage of the article and reduction in output from the mould. The difficulty of article removal can be alleviated to some extent by using an external mould release agent for example a silicone oil which is sprayed onto the mould, generally after each moulding. This practice also leads to reduction in output from the mould because of the time required for application of the mould release agent.

It has now been found that inclusion of small amounts of certain esters and particularly of glycerides selected from glycerol trioleate and certain naturally occuring glycerides into the polyurethane foam leads to easier removal of mouldings from a mould and extends the effectiveness of the mould release agent. In general, the mould release agent does not require to be applied to the mould after each moulding cycle when using the process and materials of the present invention. The present invention therefore provides a method of controlling moulding and chemical mixtures therefore. Furthermore the compatibility of the foam forming mixture appears to be improved by the use of the esters.

According to the present invention a process is provided for the production of polyurethane foam mouldings which comprises foaming a reaction mixture which comprises (A) at least one organic polyisocyanate, (B) at least one compound containing at least two isocyanate reactive groups, (C) a foaming agent, (D) a foam stabiliser and (E) up to 20% by weight based on the weight of (B) of at least one processing aid selected from esters of fatty acids containing six to twenty five carbon atoms and alcohols containing one to four hydroxyl groups, said reaction being carried out in a closed mould.

The organic polyisocyanate (A) used in the process of the present invention may be any of the polyisocyanates known for use in the manufacture of polyurethane foams. Particularly suitable polyisocyanates are the aromatic polyisocyanates, for example tolylene diisocyanate and poly- and diphenyl methane diisocyanate which are commercially available in pure and crude forms; a preferred polyisocyanate is diphenyl methane polyisocyanate having isocyanate functionality of 2.3 to 2.8. The organic polyisocyanate may also be a prepolymer formed by the reaction of an organic di-or polyisocyanate with a minor amount of a polyol. Mixtures of polyisocyanates may be used. The organic polyisocyanate may also have been modified in known manner to introduce a significant content of isocyanurate, carbodiimide, uretonimine, biuret or allophanate groups; the term polyurethane herein comprehends polymers made therefrom.

The compounds (B) containing at least two isocyanate reactive groups include polyhydric alcohols known as polyols and polyamines. Preferably the molecular weights of these compounds are between 90 (most preferably 300) and 10,000 and mixtures may be used. Such compounds include straight and branch-chained polyesters, polyesteramides, straight-chain polyalkylene glycolethers produced for example by polymerisation of alkylene oxides such as ethylene oxide and propylene oxide and other polyols produced by addition of alkylene oxides to polyfunctional materials such as for example water, 1,2-ethylene glycol, 1,2-propylene glycol, sorbitol, sucrose, glucose, butane triol. Mixtures of said compounds containing at least two isocyanate reactive groups may be used.

The reaction mixture from which the polyurethane foam mouldings herein are prepared may also contain other additives such as for example fillers, dyestuffs, pigments, flame retarding additives, activators and catalysts. Such additives are well known in the manufacture of polyurethane foam mouldings.

The foaming agent (C) herein is conventionally water and/or a low boiling point liquid such as halo lower alkanes typically dichlorofluoromethane and trichlorofluoromethane. Water reacts with isocyanate groups to produce carbon dioxide which foams the polyurethane during polymerisation reaction. The concentration of blowing agent and other components in the reaction mixture will vary depending upon the type of end use envisaged for the moulding.

The foam stabiliser (D) used herein may be any of those used and known in the art and are conventionally fatty acids and their alkali metal salts (particularly sodium salts), sulphonated derivatives of oils such as castor oil and most conveniently polysiloxanes. These foam stabilisers are generally incorporated into the compound (B) and a concentration of 0.1 to 4.0% preferably 0.1 to 0.9% by weight in compound (B) is envisaged as a preferred range herein.

The processing aid (E) incorporated herein is selected from esters of fatty acids containing 6 to 25 carbon atoms and alcohols containing 1 to 6 hydroxyl groups preferably 2 to 4; preferably the alcohol is saturated and aliphatic. The esters may be naturally occurring or synthetic and the alcohols may be fully esterified or the esters may contain unesterified hydroxyl groups. Typical acids are for example stearic acid, oleic acid, commercial fatty acids and those derived from naturally occurring fats and oils. Typical alcohols include cholesterol, polyethylene glycol, polypropylene glycol, glycol, glycerol, pentaerythritol, diethylene glycol. Preferred processing aid are synthetic glycerol trioleate and naturally occuring glycerides which cause cell structure of the foam to coarsen. Such naturally occurring glycerides include for example, coconut oil
rape seed oil
peanut oil
sunflower seed oil
olive oil The synthetic processing aids preferably have an acid and hydroxyl value of less than 3 (expressed in mg potassium hydroxide per g of processing aid). The processing aids and particularly the glycerides are used herein preferably as dispersions in the compound (B). In a preferred embodiment of the process of the present invention requires the incoporation of synthetic glycerol trioleate. This is usually prepared by complete esterification of glycerol with oleic acid to give a product substantially free of hydroxyl groups and hence of reactive hydrogen atoms. Glycerol trioleate has an additional advantage over other processing aids in that it is soluble in proportions required herein in polyisocyanate and isocyanate reactive compounds without reaction in particular with isocyanate groups. In accordance with a further aspect of the present invention a mixture is provided which comprises (F) at least one processing aid, particularly synthetic glycerol trioleate and (G) at least one organic polyisocyanate or at least one compound containing at least two isocyanate reactive groups, the concentration of the processing aid being between 0.1% and 20% by weight, preferably between 2% and 8% by weight and most preferably between 3% and 5% by weight.

The moulds used in the production of polyurethane foam mouldings are generally made from metal or other materials having high thermal conductivity and capacity but other materials such as for example glass, wood and synthetic polymeric materials are not excluded.

The invention is illustrated with reference to the following examples.

EXAMPLE 1

Polyisocyanate (A) and isocyanate reactive compound (B - a polyol) were introduced into a two component dosing and mixing apparatus, where a foamable reaction mixture was produced. The mixture was immediately fed under pressure into a steel mould heated to 60° C. The mould used was designed to produce a small table dimension about 32cm × 32cm × 32cm and volume about 3.2 liters.

The number of mouldings that could be taken out of the mould relatively easily by hand and without the use of levers, a hammer or ejection pins following one application of external mould release agent ("Acmosil") 180 (Acmos Chemikalie Fabrik Tietsen and Co., Bremen, W. Germany) was measured.

Isocyanate (A) was an isocyanate (based on phosgenation of aniline/formaldehyde condensates) having viscosity 130 centipoise at 25° C., isocyanate content 31% by weight and optionally containing glycerol trioleate.

Isocyanate reactive compound (B) was a polyether polyol having hydroxyl value 500 mg KOH/g made by reacting a mixture of propylene oxide and ethylene oxide with a mixture of trimethylolpropane and glycerol. A polyol blend (H) was prepared containing (parts by weight):
Above Polyol (B) — 100
Dimethylcyclohexylamine — 1.2
Polysiloxane (Silicone L5420) — 0.5
    (Union Carbide & Corp.)
Water — 0.35
Trichlorofluoromethane — 8.00
    ("Arcton" II — Imperial Chemical Industries Limited)

Comparison Example

A foam moulding having a weight of 1.6 kg was made from polyol (Blend H; 108 parts by weight) and isocyanate (A; 155 parts by weight), not containing a processing aid.

It was found to be difficult to remove the moulding from the mould after a mould occupation of 6 minutes. A second moulding produced without an additional application of external mould release agent could not be removed by hand from the mould and hammers and levers were required to effect demoulding.

Example According to the Invention

A foam moulding having a weight of 1.6 kg was made from polyol (Blend H; 108 parts by weight) and isocyanate (A; 160 parts by weight containing 3% wy weight synthetic glycerol trioleate. The first moulding produced after application of external release agent was very easy to remove from the mould after a mould occupation time of 6 minutes, and much easier than that of the Comparison Example. It was possible to prepare and remove by hand, 5 further mouldings without further application of external mould release agent.

EXAMPLE 2

The procedure of Example 1 was repeated except that a closed machine steel, plate mould was used having internal dimensions 1000mm × 600mm × 12.7mm.

Comparative Example

A foam moulding having a weight of 4kg was produced from polyol blend H (108 parts by weight) and isocyanate A (155 parts by weight) but not containing any processing aid. After a mould occupation time of 6 minutes, the foam moulding could be taken out of the mould only with difficulty.

Example According to the Invention

Three sets of foam mouldings were produced from polyol blend H (108 parts by weight) to which had been added 5% by weight of one of the following processing aids (one for each set): olive oil, rape seed oil, coconut oil, and peanut oil and from isocyanate A (135 parts by weight). After a mould occupation time of 6 minutes, the mouldings from all three sets could be taken out of the mould without difficulty.

EXAMPLE 3

A further series of foam mouldings were produced using the procedure of Example 1. The formulations (in parts by weight), number of moulding release obtained between each application of release agent, and quality of the appearance of the mouldings are given in the following table. The glycerol trioleate where present was predissolved in the isocyanate (A).

| Polyol (B) | 100 | 100 | 100 | 100 | 100 | 100 | 100 | 100 |
|---|---|---|---|---|---|---|---|---|
| Dimethylcyclohexylamine | 1.2 | 1.2 | 1.2 | 1.2 | 1.2 | 1.2 | 1.2 | 1.2 |
| Silicone L5420 | 0.5 | 0.5 | 0.5 | 0.5 | 0.5 | 0.5 | 0.5 | 0.5 |
| Water | 0.2 | 0.2 | 0.2 | 0.33 | 0.33 | 0.33 | 0.33 | 0.33 |
| "Arcton" 11 | 5 | 5 | 5 | 5 | 5 | 8 | 5 | 8 |
| Isocyanate (A) | 160 | 155 | 150 | 160 | 160 | 160 | 160 | 160 |
| Oleic Acid | 0 | 10 | 10 | 0 | 0 | 0 | 0 | 0 |
| Glyceroltrioleate (% Wt in isocyanate) | 5 | 5 | 0 | 4 | 3 | 3 | 0 | 0 |

-continued

| Polyol (B) | 100 | 100 | 100 | 100 | 100 | 100 | 100 | 100 |
|---|---|---|---|---|---|---|---|---|
| Number of releases | >7 | 1 | 1 | 3 | 2 | 6 | 1 | 1 |
| Moulding appearance | Flow/creep marks | Flow marks | Flow marks | Acceptable | Good | Very good | Acceptable | Acceptable |

From the table it can be seen that the use of glycerol trioleate is associated with improved release properties and that moulding appearance is most improved at the 3% level.

What we claim is:

1. A process for the production of polyurethane foam mouldings which comprises foaming a reaction mixture which comprises (A) an aromatic polyisocyanate containing at least two isocyanate groups, (B) at least one compound containing at least two isocyanate reactive groups, (C) a foaming agent, (D) a foam stabiliser and (E) 2% to 8% by weight based on the weight of (B) of at least one processing aid which is an ester of fatty acid containing 6 to 25 carbon atoms and an aliphatic saturated alcohol containing 2 to 4 hydroxyl groups, said reaction being carried out in a closed mould.

2. A process according to claim 1 in which the weight of processing aid is between 3% and 5% by weight.

3. A process according to claim 1 in which the processing aid is glycerol trioleate.

4. A process according to claim 1 in which the processing aid is selected from olive oil, rape seed oil, coconut oil, and peanut oil.

5. A process according to claim 1 in which the foaming agent (C) is water and/or a low boiling halolower alkane.

6. A process according to claim 5 in which the foaming agent comprises water and trichlorofluoromethane.

7. A moulded article whenever produced by a process as claimed in claim 1.

8. A process as in claim 1 wherein the ester is a synthetic ester.

9. A mixture consisting essentially of 99.9% to 80% by weight of an aromatic polyisocyanate containing at least two isocyanate groups and 0.1% to 20% by weight of glycerol trioleate as a processing aid.

10. A mixture according to claim 9 in which the mixture comprises between 2% and 8% by weight of glycerol trioleate.

11. A mixture according to claim 10 in which the mixture comprises between 3% and 5% by weight of glycerol trioleate.

12. A mixture as in claim 9 in which the glycerol trioleate is synthetic glycerol trioleate.

* * * * *